US006232394B1

(12) United States Patent
Bonhomme et al.

(10) Patent No.: US 6,232,394 B1
(45) Date of Patent: May 15, 2001

(54) MASTER BATCHES CONTAINING VULCANIZING AGENTS

(75) Inventors: Dominique Bonhomme, Hidron (FR); Walter Pfrengle, Stromberg (DE); Eddine Nour El Bounia, Orthez; Jean-Michel Pierrot, Grosley Sur Risle, both of (FR)

(73) Assignee: Elf Atochem S.A. (FR)

( * ) Notice: Subject to any disclaimer, the term of this patent is extended or adjusted under 35 U.S.C. 154(b) by 0 days.

(21) Appl. No.: 09/230,525

(22) PCT Filed: Jul. 29, 1997

(86) PCT No.: PCT/FR97/01418
§ 371 Date: Apr. 6, 1999
§ 102(e) Date: Apr. 6, 1999

(87) PCT Pub. No.: WO98/04617
PCT Pub. Date: Feb. 5, 1998

(30) Foreign Application Priority Data

Jul. 29, 1996 (FR) .................................................. 96 09502

(51) Int. Cl.⁷ .................................. C08J 3/00; C08J 3/20; C08K 3/04; C08L 33/00; C08F 220/10
(52) U.S. Cl. .......................... 524/523; 523/351; 524/495; 524/496; 525/330.4
(58) Field of Search ...................................... 524/523, 495, 524/496; 523/351; 525/330.4

(56) References Cited

U.S. PATENT DOCUMENTS 4,857,600 * 8/1989 Gross et al. ......................... 525/285

FOREIGN PATENT DOCUMENTS

| 277598 | 8/1988 | (EP) . |
| 2139409 | 1/1973 | (FR) . |
| 1126017 | 9/1968 | (GB) . |
| 2141719 | 1/1985 | (GB) . |
| 04183732 | 6/1992 | (JP) . |

* cited by examiner

Primary Examiner—Patrick D. Niland
(74) Attorney, Agent, or Firm—Millen, White, Zelano & Branigan, P.C.

(57) ABSTRACT

The invention relates to thermoplastic master batches having at least one copolymer (A) of ethylene and of at least one unsaturated carboxylic acid ester as support and comprising vulcanization agents for rubbers. The invention also relates to a process for the preparation of master batches containing vulcanization agents and having a thermoplastic ethylene copolymer as support, this process consisting in using an extruder.

12 Claims, No Drawings

MASTER BATCHES CONTAINING VULCANIZING AGENTS

The present invention relates to master batches containing vulcanization agents and more particularly thermoplastic master batches having copolymers of ethylene and of at least one unsaturated carboxylic acid ester as support. They are useful, for example, for introducing vulcanization agents into elastomers. The invention also relates to a process for the preparation of master batches containing vulcanization agents and having thermoplastic ethylene copolymers as support.

Vulcanized elastomers result from the mixing of an elastomer such as, for example, a styrene/butadiene copolymer with fillers, plasticizers, antioxidants, a vulcanization agent, one or more accelerators and optionally an activator, after which this mixture is shaped and heated in order to bring about the vulcanization, which is a crosslinking reaction.

The vulcanization agents, accelerator, activator and antioxidants are used at relatively low doses when compared with the other ingredients (fillers, plasticizers). Since they play a fundamental role in the crosslinking reaction, it is necessary for them to be optimally distributed in the mixture to be vulcanized. For this, these products are advantageously introduced into the mixture in the form of master batches.

As a general rule, these master batches use an elastomer as support, such as an EPDM (ethylene/propylene/diene copolymer), an EPR (ethylene/propylene copolymer), an SBR (styrene/butadiene copolymer) or an NBR (nitrile/butadiene copolymer).

By definition, these master batches contain a large amount of additives. It is necessary to choose as support a polymer which can be readily dispersed in the mixture to be vulcanized.

It is thus advantageous for this support to have an affinity with the mixtures to be vulcanized.

These master batches are generally in the form of strips or granules. One of the difficulties encountered in their use lies in their tendency to agglomerate during storage. This phenomenon is due to the tacky nature of the support at the usual storage temperatures. This agglomeration often prevents the product from being used in the usual transportation and automatic weighing installations with which mixing plants are equipped.

According to the prior art, this drawback is overcome by adding an anti-tack agent, for example talc, which is added by spraying during granulation or manufacture of the master batch strips. This process has the drawback of introducing an additional product which it is always difficult to distribute uniformly.

The Applicant has now found that master batches having copolymers of ethylene and of unsaturated carboxylic acid esters as support have many advantages.

By virtue of their polarity, these ethylene polymers disperse readily in most polymers; they have a low Vicat point, which facilitates dispersion of the master batch, and, lastly, the master batch is solid and non-tacky at room temperature, which prevents any agglomeration on storage whether the product is presented in strip form or granule form and this being with the optional addition of small amounts of anti-adhesive agent such as, for example, talc. By using the master batches of the present invention to vulcanize elastomers, no degradation of the properties of vulcanized rubbers are observed when compared with rubbers vulcanized with the master batches of the prior art.

The present invention relates to thermoplastic master batches having at least one copolymer (A) of ethylene and of at least one unsaturated carboxylic acid ester as support and comprising vulcanization agents.

By way of example, mention may be made of:
  sulphur-containing vulcanization systems consisting of sulphur combined with vulcanization accelerators such as metal salts of dithiocarbamates (zinc, tellurium, etc. dimethyldithiocarbamate), thiuram mono-, di- and tetrasulphides (thiuram tetramethyl disulphide, etc.), sulpheramides, morpholine derivatives and guanidines.
  These systems can also contain zinc oxide optionally combined with stearic acid, which are vulcanization activators for diene elastomers,
  sulphur-donating vulcanization systems in which most of the sulphur used for the crosslinking comes from sulphur-containing molecules such as thiuram polysulphides, mercaptobenzothiazole disulphide etc.,
  vulcanization systems based on metal oxides, particularly for halogen-containing elastomers (for example polychloroprene). This particularly relates to zinc oxide,
  vulcanization systems containing phenolic resins consisting of difunctional phenol-formaldehyde resins which may contain halogen and be combined with metal chlorides or zinc oxide,
  peroxide-containing vulcanization systems in which all free-radical donors can be used, for example dicumyl peroxide, combined with zinc oxide and stearic acid,
  vulcanization agents based on diamines (ortho-toluidylguanidine, diphenylguanidine, etc.) or on blocked diamines such as hexamethylenediamine carbamate,
  acceleration systems based on thiourea derivatives such as ethylthiourea or diethylthiourea.

The master batches of the invention can also contain one or more of the following products:
  antioxidants,
  anti-ozonizers,
  ultraviolet-absorbing agents,
  swelling agents,
  carbon black.

The master batches might contain only some of the vulcanization system, such as the sulphur, and the accelerator could be added separately to the elastomer.

It would not be considered a departure from the scope of the invention if the master batches also contained the other usual additives in elastomers to be vulcanized, such as plasticizers, carbon black, silica, carbonate, talc or flame-retardants. These additives are often present in the same or larger amounts than the elastomer itself and are always in much larger amounts than the vulcanization system. Such a master batch would be pointless. However, the master batches of the invention can contain a small amount of plasticizer, as will be explained later.

The elastomers to be vulcanized can be, for example, natural rubber, polyisoprene, SBR, NBR, EPDM, polychloroprene, butyl rubber or polyethers such as epichlorohydrin rubbers.

As regards the copolymer (A), the esters can come from the reaction of an unsaturated carboxylic acid with a monoalcohol having from 1 to 24 carbon atoms. By way of example, mention may be made of alkyl (meth)acrylates in which the alkyl has from 1 to 24 carbon atoms. Examples of acrylates or of methacrylates are methyl methacrylate, ethyl acrylate, n-butyl acrylate, isobutyl acrylate and 2-ethylhexyl acrylate. These eaters can be introduced into A by grafting (onto polyethylenes) or by direct copolymerization.

The amount of additives (i.e. of vulcanization agents and of other optional products) can be from 50 to 90% by weight of the master batch. Advantageously, this amount is from 80 to 90%. The density of the master batches can thus be between 1.1 and 5.5.

Advantageously, the copolymer (A) is such that the master batch is solid and non-tacky at room temperature and plastic at the operating temperatures, i.e. during mixing with the polymer and the other additives added to the polymer along with the master batch. This temperature can vary with the nature of the polymer and of the additives; as a general rule, the elastomer and all its additives, including the master batch of the invention, cannot be mixed above 100 or 110° C. without running the risk of causing vulcanization to start.

The master batches of the invention are plastic, advantageously at temperatures above 80 or 90° C. They can thus be dispersed in polymers while at the same time remaining in a region in which there is no risk, for example, of prevulcanization.

By way of example, the Mooney ML 1+4 viscosity at 50° C. of the master batches is between 15 and 25.

The master batch can comprise a plasticizer such as, for example, a paraffinic or naphthenic oil in order to facilitate the incorporation of the additives and/or to adjust the viscosity.

The Applicant has found that for the master batch to keep to the above conditions, i.e. to be solid at room temperature and plastic at the operating temperatures, it is advantageous to choose a copolymer (A) whose melting point or whose glass transition temperature or whose Vicat point is above room temperature and below the temperature of mixing with the polymer to which the master batch is added. Preferably, a copolymer (A) having a melting point of about 50 to 120° C. is chosen; its Vicat point can be below 50° C.

A mixture of copolymers (A) can be used even if none, one or more of them does not keep to the above conditions, provided that the master batch has the characteristics mentioned above.

Preferably, (A) is an ethylene/alkyl (meth)acrylate copolymer containing up to 50% by weight of (meth) acrylate and preferably 20 to 40%. These polymers can be random copolymers produced by radical catalysis at high pressure, i.e. between 500 and 3000 bar.

According to another form of the invention, the copolymer (A) can comprise other grafted or polymerized monomers (M1); by way of example of these monomers, mention may be made of:

unsaturated carboxylic acids, for example those having from 2 to 20 carbon atoms such as acrylic acid, methacrylic acid, maleic acid, fumaric acid and itaconic acid;

functional derivatives of the above acids, for example the anhydrides, amide derivatives, imide derivatives and metal salts such as the alkali metal salts;

unsaturated epoxides such as, for example, glycidyl (meth)acrylate, allyl glycidyl ether, vinyl glycidyl ether, glycidyl maleate, glycidyl itaconate, 2-cyclohexene 1-glycidyl ether, cyclohexene-4,5-diglycidyl carboxylate, cyclohexene-4-glycidyl carboxylate, 5-norbornene-2-methyl-2-glycidyl carboxylate and endocisbicyclo(2.2.1)-5-heptene-2,3-diglycidyl dicarboxylate.

For example, (A) can be an ethylene/alkyl (meth)acrylate/maleic anhydride copolymer or an ethylene/alkyl (meth)acrylate/glycidyl methacrylate copolymer.

It can comprise up to 50% by weight of (meth)acrylate and up to 10% by weight of anhydride or of glycidyl methacrylate.

According to another form of the invention, the master batch can comprise another polymer (B) which is different from (A), chosen from:

ethylene/unsaturated carboxylic acid ester copolymers grafted or copolymerized with one or more of the monomers (M1) mentioned above, on condition that these copolymers are different from (A);

copolymers of ethylene/vinyl esters of saturated carboxylic acids which can be grafted or copolymerized with at least one monomer chosen from (M1) and unsaturated carboxylic acid esters;

homo- or copolymer polyolefins which may be grafted with a monomer chosen from (M1) and unsaturated carboxylic acid esters;

EPR (ethylene/propylene) elastomers;

the elastomers mentioned above to which the master batches of the invention are added;

the above elastomers grafted with (M1) and advantageously maleic anhydride, styrene/butadiene/styrene (SBS), styrene/ethylene-butene/styrene (SEBS) and styrene/isoprene/styrene (SIS) block copolymers which are optionally grafted.

The polymer (B) is chosen such that the master batches of the invention have the properties mentioned above.

Advantageously, the master batches of the invention comprise an ethylene/alkyl (meth)acrylate polymer (A) and an ethylene/alkyl (meth)acrylate/maleic anhydride copolymer (B).

The copolymer (B) can comprise up to 50% by weight of alkyl (meth)acrylate and up to 10% by weight of maleic anhydride.

The proportions of (A) and (B) can be such that (by weight)

$$1/5 \leq A/B \leq 10/1$$

and advantageously 60 to 80 parts of (A) per 20 to 40 parts of (B). The master batches of the invention can be manufactured both by the techniques of the rubber industry and by those of the thermoplastics industry. Extruders, mixers and twin-screws can thus be used and homogenization can optionally be carried out on cylinders. The master batches of the invention can readily be filtered, this being filtration, for example, at 500, 200 or 140 $\mu$m depending on the specifications. This is an important advantage of the invention, due to the thermoplastic behavior and to the absence of anti-tack product.

Advantageously, the master batches of the invention are prepared on machines used for thermoplastics, in particular mono- or twin-screw extruders. It is thus also possible to reduce the talc or even leave it out altogether and optionally to add waxes which eliminate any tacky nature. Furthermore, the residence time in the extruders is much shorter than in the blenders or cylinders of the machines of the rubber industry; it is thus possible to work at a slightly higher temperature, which allows copolymers (A) of higher melting point, for example about 110–120° C., to be used.

The prior art FR 2,139,409 has described master batches containing vulcanization agents and having ethylene/vinyl acetate (EVA) copolymers as support. These master batches are manufactured on cylinders and granulators of the rubber industry. The Applicant has found that these master batches can be manufactured on machines used for thermoplastics, such as, for example, mono- or twin-screw extruders. The main advantages are:

the tacky nature is reduced during manufacture the process can be performed at a slightly higher temperature (the residence time is lower).

These EVA-based master batches can also contain antioxidants and various additives such as those mentioned above.

Thus, the invention is a process for the preparation of master batches containing vulcanization agents and having either at least one copolymer (A) of ethylene and of at least one unsaturated carboxylic acid ester or at least one copolymer of ethylene and of a vinyl ester of a saturated carboxylic acid as support, the said process consisting in mixing the support and the vulcanization agents in an extruder.

The process of the invention also relates to the preparation of master batches based on the copolymer (A) described above.

The process of the invention also relates to the supports for master batches based on a copolymer of ethylene and of vinyl eater of a saturated carboxylic acid (for example EVA) mixed with other thermoplastic polymers, for example those mentioned in the polymers (B) mentioned above and which are different from the copolymer of ethylene/vinyl ester of a saturated carboxylic acid and different from the copolymer (A).

EXAMPLES

The following definitions apply in the examples:

Lotryl 1: an ethylene/n-butyl acrylate copolymer with a weight proportion of 65/35 and an MFi of 900 (190° C.—2.16 kg)

Lotryl 2: an ethylene/methyl acrylate copolymer with a weight proportion of 71/29, an MFi of 2–3.5 (190° C.—2.16 kg), a melting point of 61° C. and a Vicat point <40° C.

Lotader 1: an ethylene/ethyl acrylate/maleic anhydride copolymer with a weight proportion of 91/6/3, an MFi of 200 (190° C.—2.16 kg), a melting point of 100° C. and a Vicat point of 57° C.

Lotryl 3: an ethylene/butyl acrylate copolymer with a weight proportion of 65/35, an MFi of 40 (190° C.—2.16 kg), a malting point of 67° C. and a Vicat point of <40° C.

Lotryl 4: an ethylene/methyl acrylate copolymer with a weight proportion of 65/35, an MFi of 4.5–6, a melting point of 50° C. and a Vicat point of <40° C.

Lotryl 5: an ethylene/butyl acrylate copolymer with a weight proportion of 65/35, an MFi of 260–350, a melting point of 66° C. and a Vicat point of <40° C.

MBTS: denotes mercaptobenzothiazole disulphide

DPTU: denotes diphenylthiourea

Oil: denotes a paraffin oil.

The mixtures were prepared in an internal mixer and then on follower cylinders.

The results are given in Tables 1 to 3 below. The percentages are given on a weight basis.

TABLE 1

| Composition in parts | 1 | 2 | 3 | 4 | 5 | 6 |
|---|---|---|---|---|---|---|
| MBTS | 75 | 75 | 80 | 75 | 75 | 75 |
| Oil | 10 | 10 | 10 | 12 | 10.5 | 11 |
| Lotryl 1 | 1.75 | 5.25 | 1.75 | | | |
| Lotryl 2 | 5.25 | | 3.25 | 5 | 6 | 5 |
| Lotader 1 | | 1.75 | | | | |
| Talc | 5 | 5 | | 5 | 5.5 | 6 |
| Stearine | 3 | 3 | 3 | 3 | 3 | 3 |
| Behaviour on the internal mixer | good | good | good | good | good | good |
| Behaviour on the follower cylinders | good | good | good | good | good | good |
| Filtration | good | good | good | good | good | good |
| Mooney ML1 + 4 viscosity (50° C.) | 16.6–18.8 | 15.2–15.1 | 19.8–21.5 | 24.5–23.5 | 19.5–19.6 | 18.7–17.8 |

TABLE 2

| Vulcanizing agent | No. | Polymer (A) | % (A) | % paraffin oil | % stearine | Internal mixer |
|---|---|---|---|---|---|---|
| MBTS 80% | 7 | Lotryl 2 | 9.6 | 8 | 2.4 | OK |
| DPTU 75% | 8 | Lotryl 3 | 14.31 | 10.61 | | OK |
| DPTU 77% | 9 | Lotryl 4 | 11.7 | 8.8 | 2.5 | very good |
| DPTU 77% | 10 | Lotryl 3 | 11.7 | 8.8 | 2.5 | good |
| MBTS 80% | 11 | Lotryl 4 | 12.5 | 5 | 2.5 | very good |
| MBTS 80% | 12 | Lotryl 5 | 17.5 | | 2.5 | good |
| MBTS 80% | 13 | Lotryl 5 | 15.5 | 2 | 2.5 | good |

| Vulcanizing agent | No. | Final T ° C. | Cylinder mixer | Cold behaviour | ML 1 + 4 (50° C.) | ML 4 (50° C.) | Shore A hardness |
|---|---|---|---|---|---|---|---|
| MBTS 80% | 7 | 56.6 | correct | hard, brittle mixture, does not crumble excessively | 50 | >200 | 74/74 |
| DPTU 75% | 8 | 58.8 | better behaviour + cohesive, non-tacky | fairly flexible mixture, but brittle if greatly deformed | 35 | 37 | 52/54 |

| Vulcanizing agent | No. | Cylinder mixer | Cold behaviour | ML 1 + 4 (50° C.) | ML 4 (50° C.) | Shore A hardness |
|---|---|---|---|---|---|---|
| DPTU 77% | 9 | process performed on cylinder faultless | correct flexibility not brittle | 55.4 | — | 61 |

TABLE 2-continued

| | | | temp. = 50° C. | not self-tacky | | | |
|---|---|---|---|---|---|---|---|
| DPTU 77% | | 10 | not tacky, correct cohesion adequate working temp. of 50° C. | not self-tacky very slightly flexible, brittle if sufficiently deformed | 23.6 | — | 53 |
| MBTS 80% | | 11 | excellent behaviour on cylinder at 80° C. not tacky, good cohesion | good flexibility not brittle not self-tacky | 57.9 | — | 75 |
| MBTS 80% | | 12 | mixture no longer tacky at 50° C., however it is slightly hard to work | not self-tacky brittle | 57.4 | — | 84 |
| MBTS 80% | | 13 | not tacky, works correctly | not self-tacky slightly flexible, brittle if sufficiently deformed | 54.4 | — | 76 |

Master batches containing 90% by weight of zinc oxide (ZnO) are prepared.

| Formula 1 according to the invention: | |
|---|---|
| Lotryl 2 | 4.4% |
| Oil | 4.6% |
| Stearine | 1% |
| ZnO | 90% |
| Formula 2 according to the invention | |
| Lotryl 5 | 4.4% |
| Oil | 4.6% |
| Stearine | 1% |
| ZnO | 90% |

Their Mooney viscosity is compared with that of formulations of the prior art based on EPM or on SBR.

The results are given in table 3 below:

TABLE 3

| | 50° C. | 80° C. | 100° C. |
|---|---|---|---|
| Formula 1 90% ZnO | 64 | 14 | 8 |
| Formula 2 90% ZnO | 23 | 10 | 7 |
| Formula 3 based on EPM 85% ZnO | 78 | 39 | 26 |
| Formula 4 based on SBR 85% ZnO | 94 | 50 | 30 |

What is claimed is:

1. A homogenized thermoplastic master batch comprising at least one copolymer (A) of ethylene and of at least one unsatated carboxylic acid ester as support wherein the copolymer (A) has a melting point of between 50 and 120° C. and comprising at least one vulcanization agent selected from The group consisting of a salfur-containing vulcanization system, a sulfur-donating vulcanization system, a vulcanization system comprising a metal oxide, and a vulcanization system comprising a thiourea compound.

2. A master batch according to claim 1, also comprising one or more products chosen from antioxidants, antiozonizers, ultraviolet-absorbing agents, swelling agents and carbon black.

3. A master batch according to claim 2, in which the amount of vulcanization agents and of other products is from 50 to 90% by weight of the master batch.

4. A master batch according to claim 1, in which the copolymer (a) is an ethylene/alkyl (meth) acrylate copolymer.

5. A master batch according to claim 1, also comprising a polymer (B) chosen from ethylene/alkyl (meth)acrylate/maleic anhydride copolymers.

6. A process for the preparation of a master batch containing vulcanization agents and having either at least one copolymer (A) of ethylene and of at least one unsaturated carboxylic acid ester or at least one copolymer of ethylene and of a vinyl ester of a saturated carboxylic acid as support wherein the copolymer (A) has a melting point of between 50 and 120° C., said process comprising mixing the support and the vulcanization agent selected from the group consisting of a sulfur-containing vulcanization system, a sulfur-donating vulcanization system, a vulcanization system comprising a metal oxide, and a vulcanization system comprising a thiourea compound in an extruder.

7. A master batch according to claim 1 wherein the unsaturated carboxylic acid ester is a product of the reaction of an unsaturated carboxylic acid with a monoalcohol.

8. A master batch according to claim 1 wherein the thiourea compound is ethylthiourea or diethylthiourea.

9. A process according to claim 6 wherein the thiourea compound is ethylthiourea or diethylthiourea.

10. A master batch according to claim 1 wherein the metal oxide is zinc oxide.

11. A vulcanizable composition comprising at least one halogen-containing elastomer and master batch according to claim 10.

12. A process according to claim 6 wherein the metal oxide is zinc oxide.

* * * * *

UNITED STATES PATENT AND TRADEMARK OFFICE
CERTIFICATE OF CORRECTION

| | |
|---|---|
| PATENT NO. | : 6,232,394 B1 |
| APPLICATION NO. | : 09/230525 |
| DATED | : May 15, 2001 |
| INVENTOR(S) | : Dominique Bonhomme et al. |

It is certified that error appears in the above-identified patent and that said Letters Patent is hereby corrected as shown below:

Column 7, line 49, reads "unsatated carboxylic" should read -- unsaturated carboxylic --
Column 7, line 52, reads "from The group" should read -- from the group --
Column 7, line 52, reads "salfar-containing" should read -- sufur-containing --

Signed and Sealed this

Thirtieth Day of January, 2007

JON W. DUDAS
*Director of the United States Patent and Trademark Office*